(12) United States Patent
Westlund et al.

(10) Patent No.: US 8,768,180 B2
(45) Date of Patent: Jul. 1, 2014

(54) ALL-OPTICAL, PHASE SENSITIVE OPTICAL SIGNAL SAMPLING

(75) Inventors: Mathias Westlund, Lerum (SE); Mats Skold, Gothenburg (SE); Henrik Sunnerud, Landvetter (SE); Peter Andrekson, Billdal (SE); Bernard Ruchet, Quebec (CA)

(73) Assignee: ExFo, Inc., Quebec, QC (CA)

( * ) Notice: Subject to any disclaimer, the term of this patent is extended or adjusted under 35 U.S.C. 154(b) by 380 days.

(21) Appl. No.: 13/201,576

(22) PCT Filed: Feb. 23, 2010

(86) PCT No.: PCT/IB2010/000479
§ 371 (c)(1),
(2), (4) Date: Oct. 25, 2011

(87) PCT Pub. No.: WO2010/095039
PCT Pub. Date: Aug. 26, 2010

(65) Prior Publication Data
US 2012/0134667 A1    May 31, 2012

Related U.S. Application Data

(60) Provisional application No. 61/208,427, filed on Feb. 23, 2009.

(51) Int. Cl.
*H04B 10/06* (2006.01)
*H04B 10/00* (2013.01)

(52) U.S. Cl.
USPC ............................ 398/203; 398/202; 398/212

(58) Field of Classification Search
USPC .................... 398/25, 202, 203, 212, 213, 207
See application file for complete search history.

(56) References Cited

U.S. PATENT DOCUMENTS

| | | | |
|---|---|---|---|
| 6,564,160 B2 * | 5/2003 | Jungerman et al. | 702/106 |
| 7,042,629 B2 * | 5/2006 | Doerr et al. | 359/325 |
| 2004/0071472 A1 * | 4/2004 | Ito | 398/161 |
| 2007/0041728 A1 * | 2/2007 | Dorrer | 398/16 |
| 2008/0152363 A1 * | 6/2008 | Koc | 398/208 |
| 2009/0010656 A1 * | 1/2009 | Futami et al. | 398/158 |
| 2009/0034966 A1 * | 2/2009 | Tanimoto et al. | 398/25 |
| 2010/0067607 A1 * | 3/2010 | Westlund et al. | 375/283 |
| 2010/0215357 A1 * | 8/2010 | Westlund et al. | 398/16 |

OTHER PUBLICATIONS

Andrekson, Peter A., "High Resolution Optical Waveform Sampling Techniques", Jul. 2007, IEEE/LEOS Summer Topical Meetings, pp. 234-235.*

Abdrekson, Peter A., "High Resolution Optical Waveform Sampling Techniques", Jul. 2007, IEEE/LEOS Summer Topical Meetings, pp. 234-235.*

* cited by examiner

*Primary Examiner* — Daniel Dobson
(74) *Attorney, Agent, or Firm* — Wendy W. Kaba

(57) ABSTRACT

An optical sampling arrangement for high-speed measurement of the time-varying electric field of an optical input signal utilizes coherent mixing of the optical input signal with a reference laser source in a phase-diverse optical hybrid solution, followed by optical sampling of the coherently-mixed fields at the output of the optical hybrid. The generated streams of optical samples are then detected and signal processed in order to reconstruct a sampled version of the electric field of the original optical input signal.

17 Claims, 5 Drawing Sheets

ALL-OPTICAL, PHASE SENSITIVE OPTICAL SIGNAL SAMPLING

CROSS-REFERENCE TO RELATED APPLICATIONS

This application claims the benefit of U.S. Provisional Application No. 61/208,427, filed Feb. 23, 2009, which is herein incorporated by reference.

TECHNICAL FIELD

The present invention relates to high-speed measurement of the electric field of optical signals. In particular, this invention relates to a coherent optical sampling arrangement that is particularly well-suited for measurement of the complete electric field (both phase and amplitude) of an optical input signal normally comprising optically-encoded data.

BACKGROUND OF THE INVENTION

Recent advances in the field of optical communication with new, more complex, data modulation formats as a key technology has created a need for optical waveform characterization tools that are capable of extracting more information from the waveform than simply its power as a function of time. Encoding data onto an optical carrier by modulation of both the optical field phase and amplitude has become increasingly attractive and appears to be a technological approach that will contribute to increase the capacity of future fiber optic communication links.

However, the need to measure the complete electric field of an optical signal—which is necessary to visualize both the phase and amplitude information of the signal—requires coherent detection techniques that utilize a reference phase at the measurement point. In most cases, coherent detection utilizes a continuous-wave (CW) local oscillator (LO) reference signal generated by a separate, independent laser source. The ability to "mix" the optical input signal (carrying optically-encoded data) with such a reference signal opens up the possibility of measuring the data-related, time-varying phase change of the optical input signal relative to the reference LO signal.

Coherent detection is not a novel technology; in fact, it was extensively studied during the 1980's and proposed as a solution for high-sensitivity optical-signal detection. However, implementation was difficult and with the advent of erbium-doped fiber amplifiers (EDFAs), the commercial deployment of coherent detection systems was delayed. Nevertheless, research has continued in the field and recently attracted new interest, driven by the need for more spectrally-efficient modulation formats, as well as the availability of high-speed electronic processing for post-reception compensation of transmission impairments.

The transition towards novel, advanced modulation formats for optical communication has evolved into incorporating the modulation of both amplitude and phase, creating a need for new measurement technologies that are capable of measuring the time-varying electric field of an optical input signal. In particular, the coherent detection of high-speed optical input signals will require measurement systems with a relatively large bandwidth for accurate signal reconstruction. Digital sampling is a technique that can provide sufficient bandwidth for this purpose.

Indeed, digital sampling is a well-known technique used to visualize a time-varying waveform by capturing quasi-instantaneous snapshots of the waveform via, for example, a sampling gate. The gate is "opened" and "closed" by narrow pulses (strobes) in a pulse train that exhibit a well-defined repetitive behavior such that ultimately all parts of the waveform are sampled. The sampling implementation can either be "real-time" or "equivalent-time", where real-time sampling refers to the case where the sampling rate is higher than twice the highest frequency component of the waveform (Nyquist sampling) and equivalent-time sampling refers to the use of an arbitrarily low sampling rate with a "repetitive" waveform to provide accurate signal reconstruction. The need for a "repetitive" waveform is a fundamental limitation of the equivalent-time sampling approach.

There are several digital sampling-based coherent detection systems in the prior art that facilitate characterization of the electric field of a data-carrying optical input signal by coherent mixing with a reference signal and subsequent signal processing (for signal reconstruction and visualization). Selected prior art solutions are outlined hereinbelow, including an identification of particular limitations that will be addressed by the teachings of the present invention.

FIG. 1 shows an exemplary prior art optical detection arrangement 1 for measuring the electric field of a data-varying optical input signal S (actually, a signal S(t) comprising a time-varying optical carrier oscillating at the optical carrier frequency; for the sake of simplicity referred to hereinafter as "S") by coherent mixing of its electric field with the electric field of a known CW local oscillator reference signal LO in an optical hybrid element 2. Optical hybrid 2 functions to mix these two signals, S and LO, in the complex-field space to create a set of four mixed-field optical signals: S+LO, S−LO, S+jLO and S−jLO, as shown in FIG. 1.

A square-law detection function is then applied to these signals to convert them into photodetector currents (electrical signals) to be sampled and studied. Preferably, a "balanced detector" arrangement is used that allows for intermediate frequency (IF) terms to cancel. As shown in FIG. 1, a first pair of mixed-field optical signals S+LO and S−LO are applied as separate inputs to a first balanced detector 3-A and, similarly, a second pair of mixed-field optical signals S+jLO and S−jLO are applied as separate inputs to a second balanced detector 3-B. The pair of output detector currents from balanced detectors 3-A and 3-B, respectively, can be expressed as:

$$I_1(t)=4|S(t)||LO|\cos(\omega_{IF}t+\phi_s(t)+\phi_{LO,1}), \text{ and}$$

$$I_2(t)=4|S(t)||LO|\cos(\omega_{IF}t+\phi_s(t)+\phi_{LO,2}),$$

where $\omega_{IF}=\omega_s-\omega_{LO}$ and is defined as the frequency difference between the electric fields of signals S and LO, $\phi_s(t)$ is the time-varying phase of the optical input signal (associated with the particular data pattern of the signal) and the quantity $(\phi_{LO,1}-\phi_{LO,2})$ is defined as the "relative phase shift" between each of the output signals from optical hybrid 2. In the preferred embodiment of the prior art, optical hybrid 2 is constructed to maintain a 90° (i.e., π/2 radian) phase shift between adjacent outputs.

Referring again to FIG. 1, the pair of photocurrents $I_1(t)$ and $I_2(t)$ are thereafter amplified through a pair of amplifying devices 4-A and 4-B before being digitally sampled in a pair of analog-to-digital (A/D) converters 5-A and 5-B to generate streams of output samples, shown as $O_1$ and $O_2$ in FIG. 1. Finally, digital streams $O_1$ and $O_2$ are applied as inputs to a signal processor 6, which functions to create a visualization of the electric field of optical input data signal S, based on the digital sample streams.

In most arrangements, separate laser sources are used to generate data-carrying optical input signal S and reference signal LO, so that $\omega_{IF}\neq 0$. Thus, the IF needs to be calculated by processor 6 in order to extract $\phi_s(t)$, the data-related phase modulation of optical input signal S. Once the IF portion is removed, it is straightforward to extract both the amplitude and phase information of optical input signal S and thereby visualize the measured signal in a convenient manner (for example, a constellation diagram).

Prior art coherent detection arrangement 1 as shown in FIG. 1 employs an electronic sampling technology that has at least one significant drawback—the bandwidth limitation of the electronic A/D converter and sampling circuits (i.e., for "electronic sampling"). Indeed, the highest available analog bandwidth in today's A/D converters is on the order of 20 GHz (at best); therefore, the maximum measurable signal baud is around 10 GBaud.

FIG. 2 shows another exemplary prior art arrangement for a coherent detection, in this case comprising a linear optical sampling system that is capable of measuring the complete electric field of the optical input signal. The configuration is similar to that of FIG. 1, with optical hybrid 2, balanced detectors 3, amplifiers 4 and A/D converters 5 all functioning as discussed above.

In this case, optical input signal S is mixed in optical hybrid 2 with a reference signal LO originating from a "pulsed" sampling laser source 7. The main difference between the prior art linear sampling system in FIG. 2 and the electronic sampling system in FIG. 1 is the utilization of a "pulsed" LO signal source in the arrangement of FIG. 2. In contrast, a continuous wave (CW) source is employed in the prior-art arrangement of FIG. 1. Pulsed sampling laser source 7 thus serves as a source of both reference signal LO for coherent detection and a strobe signal enabling a fast optical gating functionality that is independent of the limited bandwidth of A/D converter 5. By reducing the optical sampling rate to well below the analog bandwidth of A/D converter 5, the "equivalent" measurement bandwidth of the overall system will be dictated only by the temporal resolution of the optical sampling gate (roughly the pulse width of the pulsed LO reference source 7, advantageously on the order of a few picoseconds or less).

As before, the four output mixed electric-field signals from optical hybrid 2 are applied as inputs to a pair of balanced detectors 3-A and 3-B. The output detector currents $I_1(t)$ and $I_2(t)$ are then amplified by amplifiers 4-A and 4-B and applied as separate inputs to A/D converter 5. In this prior art linear sampling system, A/D converter 5 needs to operate at the same sampling rate as pulsed sampling laser source 7. To accomplish this, a photodetector 8-D and a pulser circuit 8-P are coupled in series between pulsed sampling laser source 7 and A/D converter 5 and used to create a clock signal that synchronizes the sampling rate of pulsed sampling laser source 7 with the sampling rate of A/D converter 5. With acquired batches of samples of the photodetector currents from A/D converter 5, the required signal processing needed in order to reconstruct the original waveform is similar to that described for the electrical sampling case in FIG. 1 and is not explicitly illustrated in FIG. 2.

There remains, however, a few drawbacks with this hardware implementation, particularly related to strict wavelength requirements on the pulsed sampling laser source. That is, the linear optical sampling technology requires the sampling-pulse spectra to overlap the optical signal spectra in order to provide distortion-free gating and coherent mixing using the same laser source. This requirement complicates the possibility of providing an optically broadband measurement system, since if the wavelength of the optical input signal is changed, the pulsed sampling laser source must also adapt its wavelength.

Another parameter that is even more challenging is the fact that the pulse-to-pulse phase stability of pulsed sampling laser source 7 must be very stringent; that is, each pulse conserves a phase relation with the preceding pulse as if one were "pulse carving" narrow, temporal slices (e.g., linewidth <1 MHz) of the output from a CW laser source at the sampling rate. While such low-phase-noise sources are known in the art (e.g., passively-modelocked fiber ring lasers), their repetition rate is generally less than about 20 MHz. Indeed, there are no tunable commercial, suitably low-phase-noise short-pulse sources capable of offering the typically >500 MHz sampling rate that is most desirable for robust IF recovery algorithms.

Thus, a need remains in the art for an arrangement capable of characterizing (visualizing) the complete electric field of high symbol rate ("baud") optical signals without being hampered by limited electrical measurement bandwidth or by the need for unnecessarily complicated optical sampling pulse sources.

SUMMARY OF THE INVENTION

The needs remaining in the prior art are addressed by the present invention, which relates to a coherent optical sampling arrangement that is particularly well-suited for measurement of the complete electric field (both phase and amplitude) of an optical input signal normally carrying optically-encoded data.

In accordance with one embodiment of the present invention, a data-carrying optical input signal S is first coherently mixed with a reference local oscillator signal LO in an optical hybrid to create at least two composite output signals comprising complex-field sums of signals S and LO. Each of these composite output signals is thereafter independently sampled (preferably in a nonlinear optical system), using a separate pulse ("strobe") that preserves the relative phase between S and LO.

In a particular embodiment of the present invention, the strobe signal is applied as an input to the optical hybrid (combined on the same signal path as either optical input signal S or reference signal LO (preferably, reference signal LO), rather than applying the strobe signal as a direct input to the sampling gate. In this arrangement, an optical signal is used as the strobe signal. By passing the strobe signal through the same optical element (i.e., optical hybrid) as signals S and LO, the need for adjusting the relative timing between these signals at the input of the sampling gate is eliminated since all signals will propagate along the same optical signal path.

In a preferred embodiment of the present invention, a 90° optical hybrid is utilized create a set of in-phase and quadrature complex-field sums as the composite output signals, designated as S+LO, S−LO, S+jLO and S−jLO.

It is a significant aspect of the present invention that optical sampling process is insensitive to any pulse-to-pulse phase instabilities (i.e., phase noise) that may be present in the strobe source and, therefore, allows for both the phase and amplitude information of the data signal to be recovered. A nonlinear optical sampling process, for example embodying four-waving mixing (FWM), is one preferred implementation of the present invention. Other nonlinear processes associated with $\chi^{(2)}$ or $\chi^{(3)}$ techniques may be used.

A polarization-multiplexed embodiment of the present invention may be utilized to reduce the number certain, relatively expensive components that are needed to process the set of output signals from the optical hybrid.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like components in various configurations.

DETAILED DESCRIPTION

Figure 1:
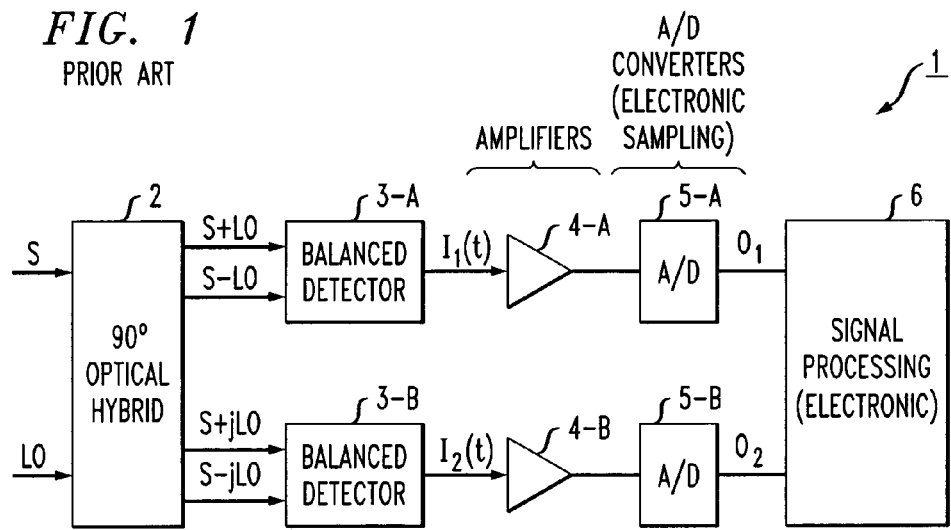
FIG. 1 illustrates an exemplary prior-art arrangement for measuring the electric field of a data-carrying optical input signal by coherent mixing in combination with electrical sampling and signal processing.
Figure 2:
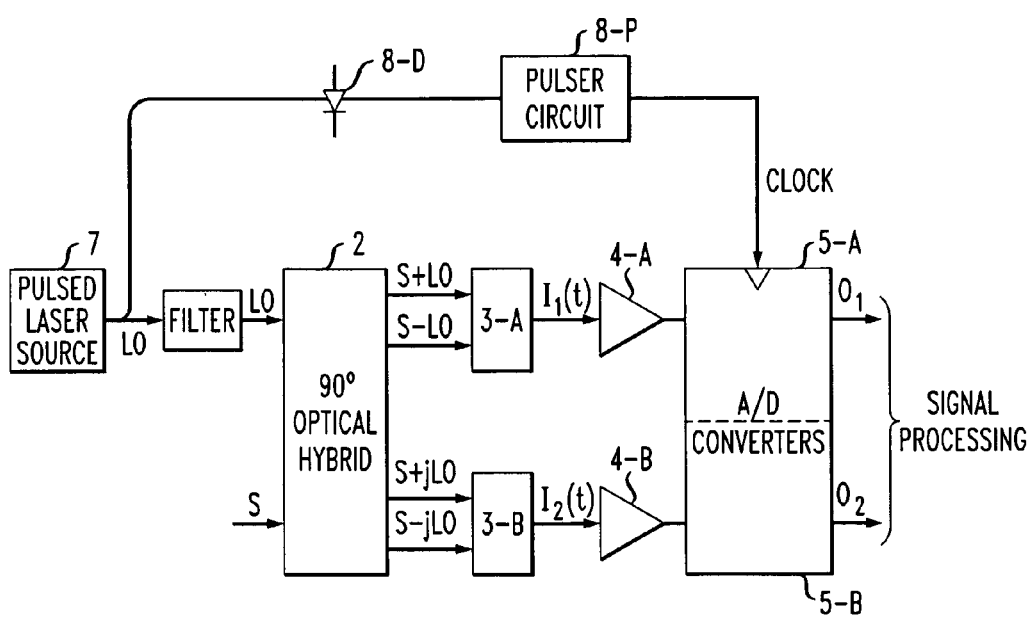
FIG. 2 illustrates an alternative prior-art configuration, using a technique known as linear optical sampling employing a single optical pulse source for both optical gating and reference mixing.

As discussed above, optical sampling technologies can provide extremely high bandwidth measurement capabilities, depending on the temporal width of the strobe pulses (also referred to herein as "gating" pulses) used to form the sampling signal. In this regard, measurement bandwidths as high as 500 GHz have been demonstrated, and optical sampling has been implemented using a wide variety of nonlinear phenomena and hardware arrangements.

A key aspect to the present invention is that in addition to providing a high measurement bandwidth, the optical gating preserves the relative phase relationship between optical input signal S and reference signal LO throughout the entire sampling process, where the relative phase relationship is not affected by pulse-to-pulse phase instabilities of the strobe source. In a preferred embodiment of the present invention, this phase preservation is an inherent consequence of utilizing a nonlinear optical system as the sampling component. In this way, therefore, the complete electric field (phase and amplitude) of optical input signal S can be recovered. The nonlinear optical system preferably uses four-wave mixing (FWM) between each of the composite output signals (at the output of the optical hybrid) and the optical strobe source.

The exemplary FWM process requires optical phase matching for efficient nonlinear interaction and, as a result, the generated sampled output field has a phase that is directly dictated by the phases of S, LO and the optical strobe source. In fact, as will be discussed in detail below, the sampling of S and LO can be viewed as separate, independent processes. Therefore, the portion of the generated sampled field originating from optical input signal S will have an optical phase that is determined only by the relative phase difference between S and the strobe source; similarly, the portion of the generated sampled field associated with reference signal LO will have an optical phase associated with the phase difference between LO and the strobe source. Since the sampling of S and LO are, in fact, performed simultaneously with the same strobe pulses, the phase of the strobe pulses will not be critical when combining S and LO, since only the relative phase difference between the two generated portions of S and LO will influence the electric field measurements.

Further, since the present invention is designed to measure the electric field of a time-varying optical input signal S, the ability to extract relative phase information is challenging and must obviously be performed on an on-going basis. Indeed, it is key to understand that since the sampling process of the present invention will affect the phases of S(t) and LO to the same extent as they propagate through the sampling system, the relative phase between the sampled version of S and the sampled version of LO will be directly determined by the relative phase between S and LO ab initio.

The relative phase itself can be divided into two separate components: (1) a slow, intermediate frequency (IF) phase part associated with the optical carrier frequency offset between S and LO (capable of being removed by well-known signal processing tools in order to extract the optical signal phase modulation of interest); and (2) a fast, time-varying phase part associated with the data modulation of optical input signal S.

Figure 3:
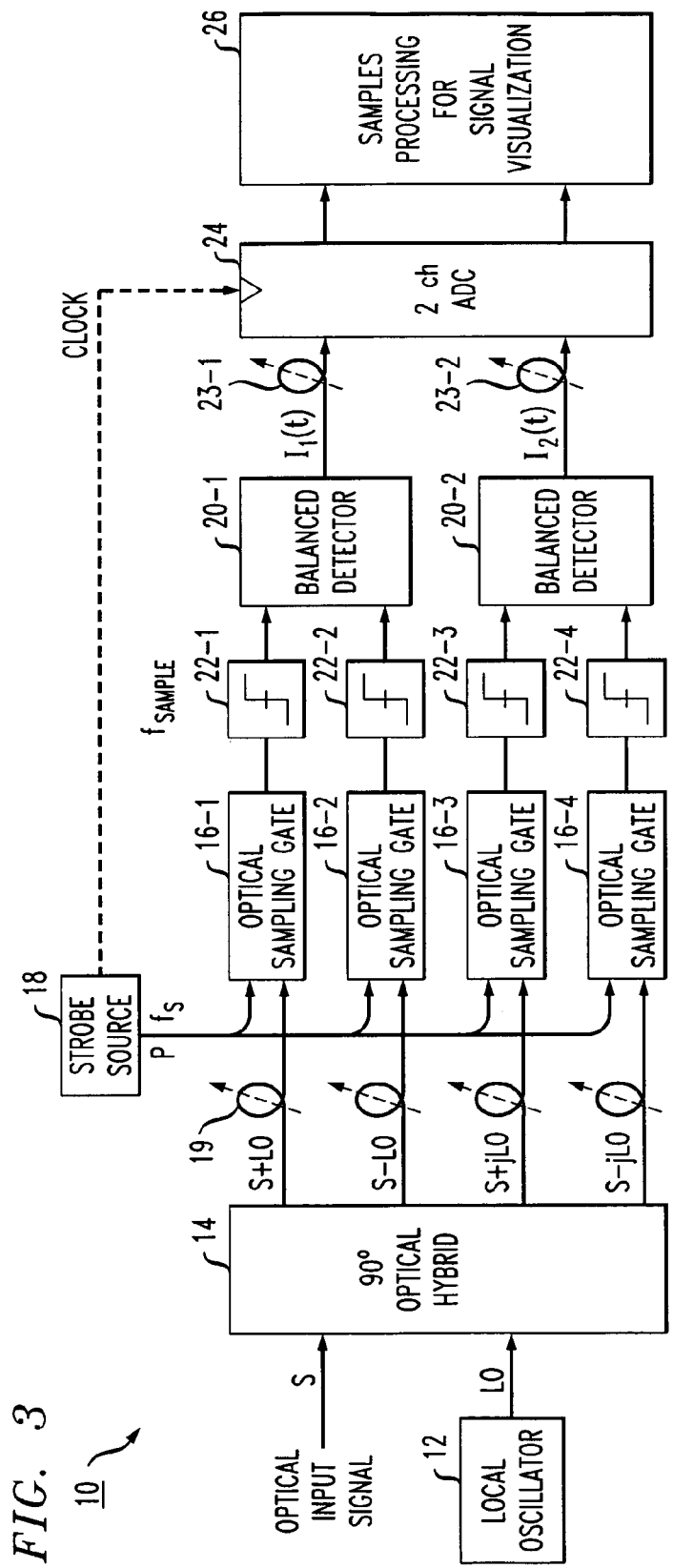
FIG. 3 illustrates a first embodiment of the present invention, using separate lasers to generate the LO reference signal and the strobe pulses, while employing optical sampling of the composite output signals from the optical hybrid.

With this background information, the details of a first embodiment of the present invention can now be understood, where FIG. 3 illustrates an exemplary optical coherent detection system 10 utilizing optical sampling in accordance with the present invention. As shown, a data-carrying optical input signal S and a CW local oscillator reference signal LO (from a controlled laser source 12 operating at a different wavelength, i.e., optical frequency) are applied as separate inputs to an optical hybrid 14. As with the prior-art systems discussed above, the use of a 90° optical hybrid is preferred, but not required.

As well-known in the art, optical hybrid 14 operates to first split signals S and LO along four separate optical paths, introduce a predetermined phase delay along at least one path, and then combine the components along a set of output signal paths to form a set of composite output signals. In the preferred case where a 90° optical hybrid is used, a set of four composite output signals (a pair of in-phase signals and a pair of quadrature-phase signals) comprising their complex-field sum components are formed.

After coherent mixing in optical hybrid 14, the four composite output signals are then sampled in a sampling process implemented within a plurality of sampling gates 16-1, 16-2, 16-3 and 16-4, where in accordance with the teachings of the present invention, each sampling gate 16 is disposed to receive a separate one of the four complex-field sum outputs from hybrid 14. As will be discussed below, the sampling process may utilize electronic sampling pulses or optical sampling pulses, and either a linear or nonlinear sampling process may be used.

In accordance with this FIG. 3 embodiment of the present invention, a pulse train P of "gating pulses" is created by a strobe source 18 (operating at a wavelength (if optical) different than either S or LO) and applied as a separate input to each of sampling gates 16-1 through 16-4. Strobe source 18 provides a pulse train P at a known repetition rate $f_s$ that will interact with each of the composite output signals as they propagate through each sampling gate and create sampled versions thereof at the outputs of sampling gates 16. It is to be understood that pulse train P need not comprise pulses having a constant temporal spacing (i.e., characterized by a constant value of $f_s$) but may include any known, repetitive pattern.

By utilizing a preferred nonlinear interaction between each composite output signal and the gating pulses, each sampling gate 16-1 through 16-4 generates a new, pulsed optical field ("idler") at a carrier frequency separated from the gating pulses, S and LO. The energy of each generated pulse (sample) is proportional to the signal power at the temporal overlap between each composite output signal and the gating pulses within each nonlinear sampling gate.

As mentioned above, the sampling of S and LO can be viewed as separate, independent processes. Therefore, within each sampling gate 16-x, the portion of the generated sampled field originating from optical input signal S will have an optical phase that is determined only by the relative phase difference between S and the strobe source. Similarly, the portion of the generated sampled field associated with reference signal LO will have an optical phase associated only with the phase difference between LO and the strobe source. Indeed, the exemplary sampling process operates on each portion of the composite output signal independently. Therefore, when combining these two independent portions, the phase of the strobe pulses will not be critical, since only the relative phase difference between the two generated portions of S and LO will influence the electric-field measurements.

It is an important aspect of the present invention that the sampling of each of the composite output signals be carefully synchronized (by, for example, introducing optical delay(s) 15 into one or more of the signal paths between hybrid 14 and the plurality of sampling gates 16) to ensure that the same portion of signals S and LO are being sampled in each of the separate gates 16-1, 16-2, 16-3 and 16-4. This adjustment would conceivably be performed during fabrication of the measurement apparatus and would remain fixed thereafter. However, it is also possible to configure a "tunable" arrangement where the delay along one or more signal paths may be adjusted during use to offset factors such as environment, aging, or the like.

As mentioned above, the sampled versions of the composite output signals are generated at new wavelengths separate from the respective wavelengths of the original electric fields of S and LO (as well as the strobe source). The sampled versions, which are used for processing and measurement of the complete electric field of optical input signal S, are extracted from the other components of the signal appearing at the output of each sampling gate 16. As shown in FIG. 3, each path includes a separate bandpass filtering element 22-1, 22-2, 22-3 and 22-4, which is "tuned" to permit only the sampled versions to continue to propagate through the system. The filtered samples are thereafter applied as inputs to a pair of balanced detectors 20-1, 20-2. Balanced detectors 20-1, 20-2 function in the manner described above in association with prior-art detectors 3, with the square-law balanced detection of the sampled versions of the composite output signals resulting in that only the "mixing" terms between S and LO will remain in output electrical currents $I_1(t)$ and $I_2(t)$ from detectors 20-1 and 20-2, respectively. The non-mixed terms are ideally cancelled by subtraction in the balanced detection process. After balanced detection, electrical currents $I_1(t)$ and $I_2(t)$ can be amplified (not shown) before being individually, electrically sampled in an A/D converter 24.

In accordance with the present invention, the sampling rate used in A/D converter 24 must be substantially synchronous with (i.e., the same as, a multiple of, or a sub-multiple of) the optical sampling rate determined by the repetition frequency $f_s$ of strobe source 18. Also, there is preferably a separately-controlled time-delay element 23 disposed at each input to A/D converter 24 in order to adjust the timing between the electrical sampling in each channel of A/D converter 24 and the incoming electrical signals so as to ensure that each signal is sampled at essentially its peak value. As with the delay arrangement discussed above, this adjustment would conventionally be performed during manufacture of the system and remain fixed thereafter.

Furthermore, the analog bandwidth of A/D converter 24 needs to be sufficiently large so as to separate each sampled value—preferably, at least on the order of repetition frequency $f_s$—which is still well below the probable bandwidth of the original optical input signal S.

After the streams of samples are digitized in A/D converter 24, they are applied as inputs to a signal processor 26 that functions to remove the influence of the IF component between S and LO and then extract the time-varying electric field amplitude and phase of optical input signal S.

The arrangement of the present invention as shown in FIG. 3 generates sampled information about the amplitude and phase of optical input signal S as a function of time. As a result, the detection arrangement of the present invention provides the possibility to visualize the measured signal in great detail, and in a variety of ways. For example, the optical-signal field can be visualized in a constellation diagram that represents the complex plane of the optical-field vector (phasor). Inasmuch as constellation diagrams do not illustrate the time-dependent portion of the optical signal, visualization of phase, amplitude or optical power in an eye-diagram or data pattern form is also possible to include this time-varying portion. It is to be understood that the mode or modes of visualizing the data is independent of the particulars of the present invention and is properly a design choice of the user.

In an alternative to the FIG. 3 embodiment, the pair of balanced detectors 20-1, 20-2 can be replaced by a set of four separate photodetectors (not shown), each coupled to a separate one of the four outputs from sampling gates 16-1 through 16-4. Each of the four generated photocurrents would then be individually passed through an A/D conversion process, where the necessary "balanced detection" would thereafter be emulated within signal processor 26 to ultimately produce the same functionality as when using a pair of balanced detectors.

In yet another alternative, only a subset of the composite signal outputs from optical hybrid 14 (e.g., a single pair of orthogonal outputs) may be subjected to further processing (for example, orthogonal outputs S+LO and S+jLO). This alternative is referred to as "single-ended" detection and employs a reduced number of components downstream of optical hybrid 14 (i.e., a pair of sampling gates, a single balanced detector and a single A/D converter). In this case, however, the non-mixing terms of the complex-field sums will be carried throughout the process and thus remain at the output of the detectors. Hence, a higher LO-to-S ratio is required (as compared to the balanced detection case) for proper measurement of the electric field amplitude and phase in the presence of these non-mixing terms.

Figure 4:
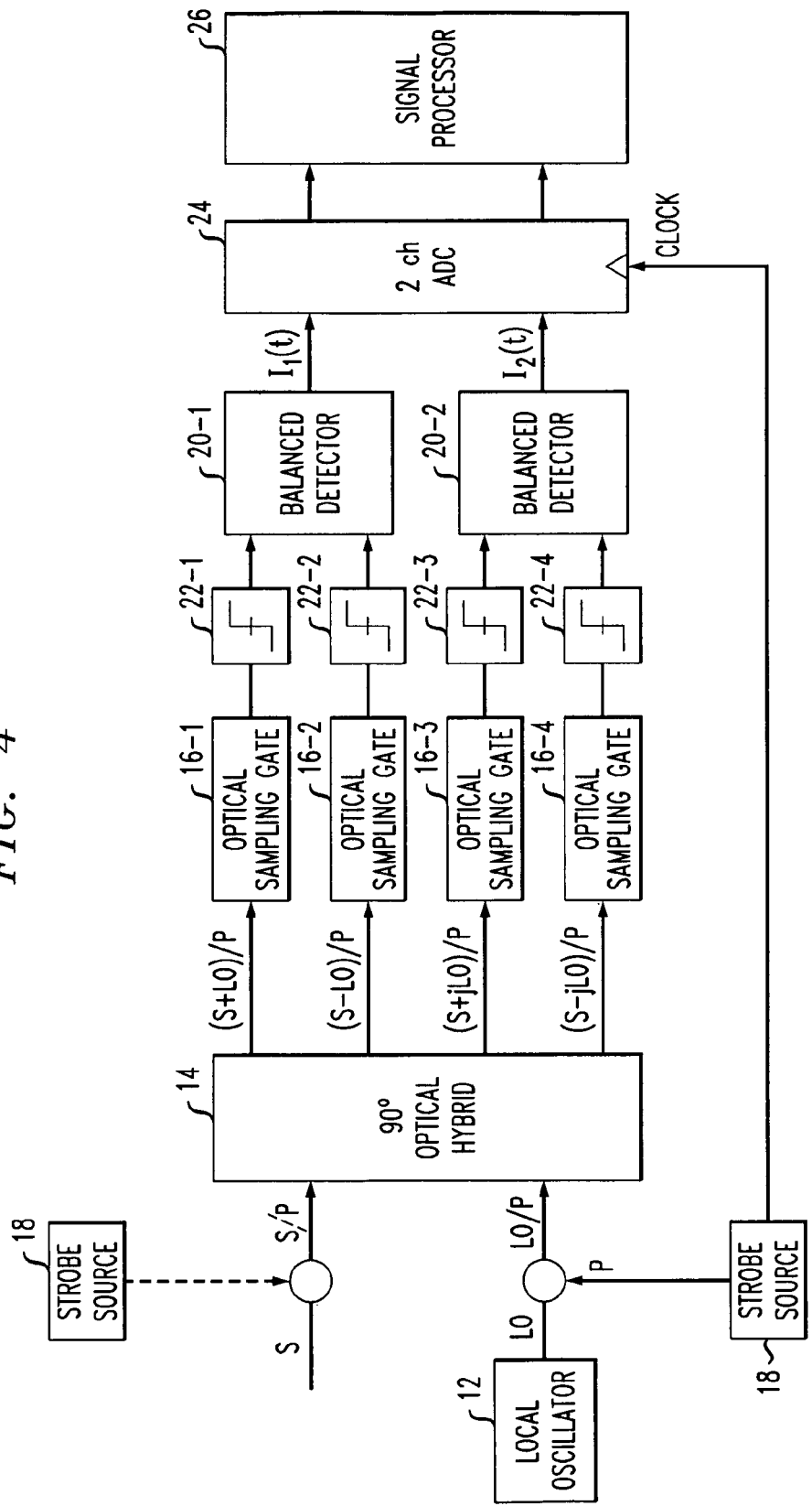
FIG. 4 is an alternative arrangement of the embodiment of FIG. 3, where the gating pulses are applied to reference signal LO at the input to the optical hybrid.

In yet another alternative of the embodiment of FIG. 3, the need for an optical-delay arrangement between optical hybrid 14 and sampling gates 16 is circumvented by applying pulse train P as an input to optical hybrid 14. FIG. 4 illustrates this alternative, where by passing pulse train P through the same component (i.e., optical hybrid 14) as signals S and LO, it is automatically ensured that pulses P will sample the same temporal portion of optical input signal S and there is no need for delay elements to be used at the inputs to the sampling gates. Additionally, if initially aligned, the SOPs of pulse train P and the portions of the LO fields (or S fields) in each of the four composite output signals will remain substantially aligned, eliminating the need to use polarization-maintaining fiber.

As shown in FIG. 4, reference signal LO from laser source 12 is first combined with pulse train P from strobe source 18 in an optical coupler 9 to produce a multiplexed output signal, shown as LO/P in FIG. 4. When combined with optical input signal S within optical hybrid 14, the result is a set of four complex-field sums that are co-propagating with pulse train P, the outputs from optical hybrid 14 denoted (S+LO)/P, (S−LO)/P, (S+jLO)/P and (S−jLO)/P in FIG. 4. The combination of each composite output signal and its associated pulse train P is then applied as an input to a separate one of the plurality of sampling gates 16-1 through 16-4 and processed in the manner described above. While FIG. 4 illustrates pulse train P being combined with reference signal LO, it is to be understood that pulse train P may alternatively be combined with optical input signal S (as shown in phantom in FIG. 4).

Referring back to arrangement 10 of FIG. 3, it is seen that this configuration requires that the number of sampling gates 16 be equal to the number of outputs from optical hybrid 14, while the number of input channels to A/D converter 24 must be half the number of sampling gates 16 (when using balanced detection). Sampling gates and A/D converters represent relatively expensive components in the overall system and, therefore, it would be attractive to provide an arrangement with a reduced number of these components.

Figure 5:
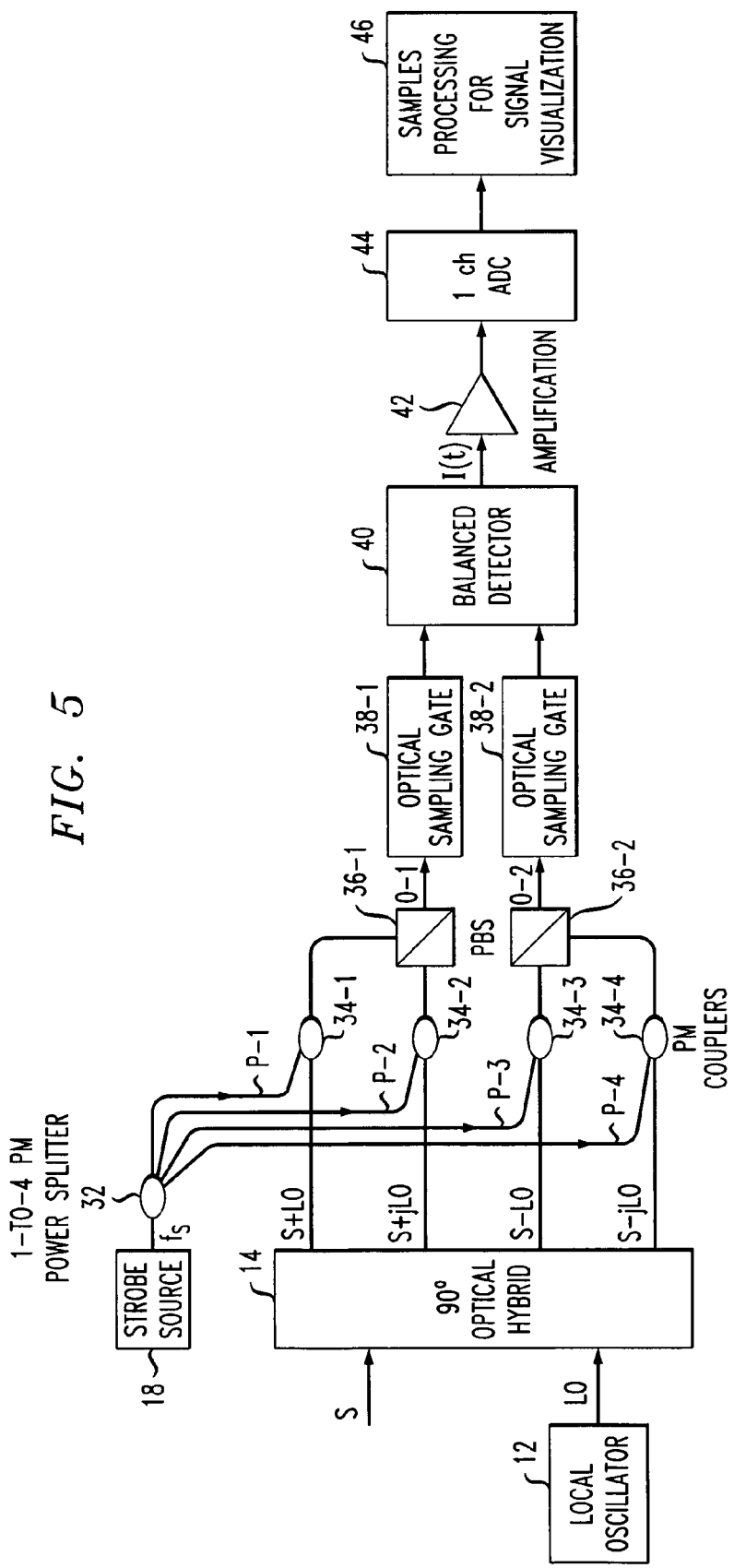
FIG. 5 illustrates an alternative, polarization-multiplexed embodiment of the present invention.

FIG. 5 illustrates an embodiment of the present invention that provides a reduction in the required number of critical-cost components. In this case, polarization-diversity techniques are used by inserting a polarization-multiplexing arrangement at the output of the optical hybrid. Particularly, orthogonal pairs of composite output signals from optical hybrid 14 are polarization-multiplexed before sampling in order to reduce the number of sampling gates, balanced detectors and A/D converter channels by a factor of two. That is, signal pair S+LO,S+jLO is used as a first pair of orthogonal signals and signal pair S−LO,S−jLO is used as a second pair of orthogonal signals. A prerequisite for this embodiment to properly function is that the sampling process be strongly dependent on the relative state of polarization (SOP) of the interacting sampling pulses and the optical field being sampled.

As long as this is possible (as when using, for example, FWM as a nonlinear sampling functionality), two orthogonally-polarized, independent sampling paths are created within the same sampling gate. The orthogonally-polarized, independent sampling paths in each sampling gate can then be used to independently and simultaneously sample two of the composite output signals from optical hybrid 14; therefore, the number of sampling gates is reduced by a factor of two.

The specifics of this polarization-multiplexed embodiment are shown in FIG. 5, where optical input signal S is first coherently mixed with reference signal LO in the same manner as described above within optical hybrid 14. The same strobe source 18 is also used to generate a pulse train of gating pulses at the repetition frequency $f_s$. Beyond the outputs of hybrid 16 and strobe source 18 in this FIG. 5 embodiment, however, all remaining components should be "polarization maintaining", since the alignment of the interacting fields is critical and "crosstalk" between the orthogonal signal streams must be avoided.

Referring to the particular polarization-multiplexed implementation illustrated in FIG. 5, the output from strobe source 18 is first applied as an input to a polarization-maintaining power splitter 32 to create a set of four output streams of sampling pulses, denoted P-1, P-2, P-3 and P-4 in FIG. 5. These streams of sampling pulses (each propagating along a polarization-maintaining signal path) are thereafter combined with the four composite signal outputs from optical hybrid 14 in a set of four polarization-maintaining optical couplers 34-1, 34-2, 34-3 and 34-4, respectively. At the output of each optical coupler 34, the combined fields of all three signals (S, LO and P) are co-polarized (i.e., each signal exhibits the same SOP). Since the wavelength of strobe source 18 is selected to be well-removed from the wavelengths of S and LO, wavelength-division multiplexers (e.g., "WDM couplers") may be used to implement couplers 34 with relatively low loss.

The polarization-maintained output signals from couplers 34-1 and 34-2, representing composite output signals S+LO and S+jLO, respectively, are thereafter applied as separate inputs to a first polarization beam splitter/combiner (PBS) 36-1. As shown, these signals are applied to orthogonally-oriented inputs, allowing them to be combined along a single output signal path, denoted O-1, while maintaining complete separation therebetween (that is, without introducing any crosstalk between them). In a similar fashion, the polarization-maintained composite signal output signals from couplers 34-3 and 34-4 are applied as orthogonal inputs to a second PBS 36-2, allowing these signals to be launched onto an output signal path O-2 while retaining their separate, orthogonal orientations.

The pair of polarization-maintaining signals propagating along first output signal path O-1 (representing S+LO and S+jLO) are thereafter applied as an input to a first sampling gate 38-1, with the signals along output path O-2 (representing S−LO and S−jLO) coupled into a second sampling gate 38-2. By implementing sampling gates 38-1, 38-2 using a strongly polarization-dependent process, the complex-field sums from hybrid 14 will retain their respective SOPs as they propagate therethrough, allowing the pair of signals passing through a single sampling gate to be sampled without introducing crosstalk therebetween.

The utilization of a FWM process within each nonlinear sampling gate results in the sampled versions of these signals being generated at a wavelength that is well separated from the wavelengths of S, LO and strobe source 18. As a result, the generated streams of samples can be extracted using an optical filter (not shown), where the filtered streams are thereafter applied as separate inputs to a polarization-maintaining balanced detector 40.

In order for the polarization-multiplexed sampling scheme illustrated in FIG. 5 to properly function, the balanced detection of samples originating from the pair S+LO, S−LO need to be separated from the balanced detection of samples originating from S+jLO, S−jLO. This functionality is achieved in the embodiment of FIG. 5 by, for example, time-interleaving the sampling of the orthogonal sampling paths in optical sampling gates 38-1, 38-2.

Figure 6:
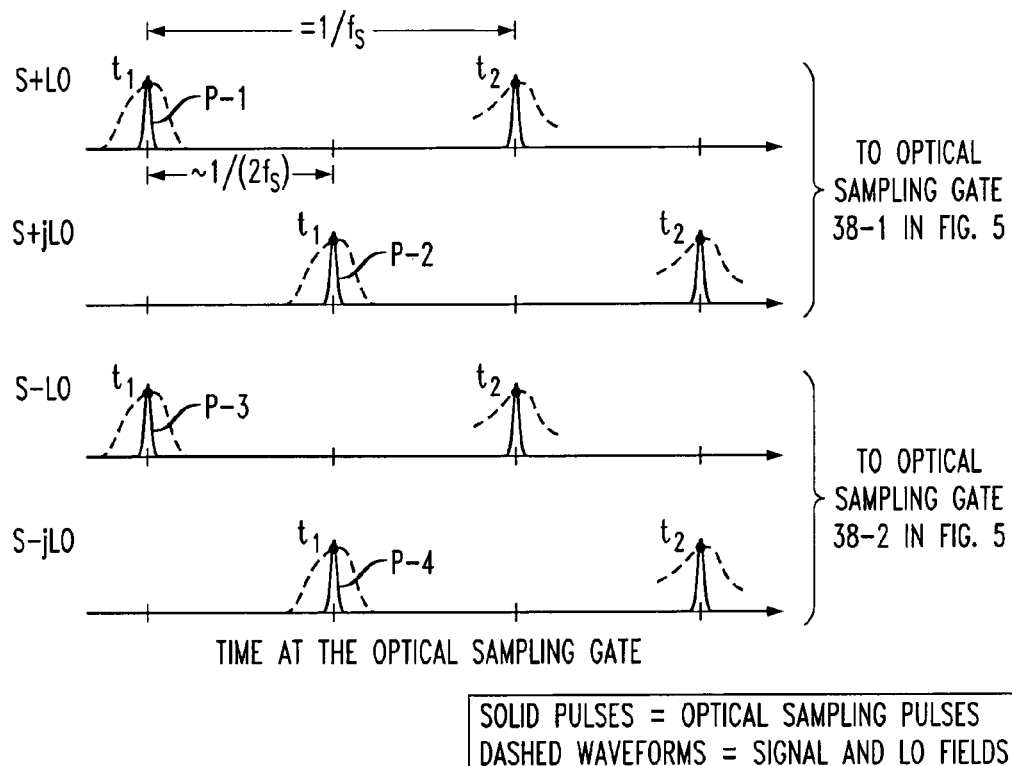
FIG. 6 is a timing diagram associated with the implementation of the embodiment of FIG. 5.

FIG. 6 shows a timing diagram useful in understanding an exemplary timing alignment useful for this purpose. The complex-field sums S+LO, S+jLO, S−LO, S−jLO are shown as dashed waveforms in the timing diagram, along with the respective sampling pulses P-1, P-2, P-3 and P-4 shown as solid pulses. It is critical that the same part of the optical input signal S be sampled in all four sampling paths, using each respective sampling pulse stream from power splitter 32, in order for accurate electric field measurements of optical input signal S to be made.

Figure 7:
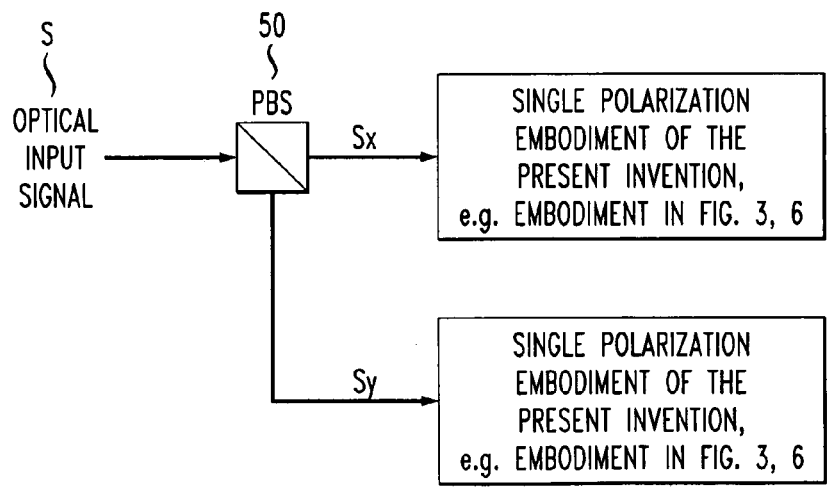
FIG. 7 illustrates yet another embodiment of the present invention, in this case for measuring both orthogonal states of polarization of optical input signal S.

Referring to FIG. 7, the times $t_1$ and $t_2$ denote two, consecutive sampling positions of optical input signal S, these positions separated by the temporal separation $1/f_s$ of the sampled optical pulses. As also shown, the pair of orthogonally-polarized composite output signals S+LO, S+jLO entering sampling gate 38-1 are delayed relative to each other by approximately $1/(2f_s)$. The corresponding sampling pulses P-1 and P-2 are also properly delayed relative to each other so as to overlap their associated composite output signal at sampling times $t_1$ and $t_2$ for both polarizations. A similar relative delay is also shown in FIG. 6 for the orthogonally-polarized composite output signals S−LO and S−jLO entering sampling gate 38-2.

The outputs from sampling gates 38-1, 38-2 are therefore two separate streams of samples, at the sampling rate $2f_s$ that maintains their relative separation. These streams are thereafter applied as inputs to balanced detector 40, where the samples originating from S+LO and S−LO must simultaneously enter balanced detector 40 in order to be properly subtracted in the balanced-detection process. A similar timing condition exists for samples from the pair of complex-field sums S+jLO and S−jLO.

The generated electrical stream of impulses I(t) from balanced detector 40 is then amplified in amplifier 42 and digitized by electrical sampling in a single channel A/D converter 44, where the A/D converter needs to be capable of sampling incoming electrical signal I(t) at a sampling rate of $2f_s$. Again, the sampling needs to be properly delayed, relative to I(t), in order to sample at the peak values of the representation of the signal.

After digitization of the measured samples, it is straightforward to separate the samples originating from S+LO and S−LO from those originating from S+jLO and S−jLO. The two streams of digital samples are applied as inputs to a signal processor 46, which functions to remove the influence of the IF between the original optical input signal S and reference signal LO, and then extract the time-varying electric field amplitude and phase information of optical input signal S.

It is possible to further extend the reduction of critical components in the embodiment of FIG. 5 by employing independent, counter-propagating sampling gates in the same nonlinear media (for example, highly-nonlinear optical fiber). For example, sampling gates 38-1 and 38-2 can be replaced by a pair of optical circulators, with a single nonlinear optical sampling gate disposed therebetween, with the sampling functionality thus being implemented in both directions of propagation. In addition to reducing the amount of expensive hardware, this embodiment contributes to achieving close to identical sampling efficiencies in all gates for a wide wavelength range.

In yet another alternative to the embodiment of FIG. 6, balanced detector 40 may be replaced by a pair of two separate detectors, followed by amplification and individual A/D conversion of the two sample streams. As mentioned above with the embodiment of FIG. 3, "balanced" detection process can then be emulated in processor 46 to yield the same functionality.

The very same approach can be used to increase the effective sampling rate without increasing the required ADC sampling speed and bandwidth. This approach is useful when the optical-sampling bandwidth is much higher than the ADC analog bandwidth, for example, for real-time sampling implementations at high baud.

The embodiments of the present invention illustrated in FIGS. 3 and 5 are limited to measurement of one polarization axis of optical input signal S. Hence, optical input signal S should be aligned properly into the optical hybrid solution in order to optimize the measurement of the signal. However, FIG. 7 illustrates an embodiment of the present invention which extends the inventive functionality to measure orthogonal polarization components of optical input signal S. FIG. 7 shows a polarization-diverse scheme where optical input signal S is decomposed into two orthogonal linearly-polarized field components $S_X$ and $S_Y$ using, for example, a polarization beam splitter (PBS) 50. The two polarization field components $S_X$ and $S_Y$ can then be individually measured using any of the above-described embodiments of the present invention. The LO reference laser and strobe source used in the embodiments shown in FIGS. 3 and 5 can be reused for measurement of both $S_X$ and $S_Y$, thereby reducing the needed hardware.

By measuring the two polarization field components $S_X$ and $S_Y$ at times corresponding to common sampled "slices" of the original optical input signal S, it is possible to implement the functionality of polarization-independent measurement of optical input signal S by combining the measured field components $S_X$ and $S_Y$ back to the original electric field of optical input signal S. In this case, the signal-processing part of the invention responsible for IF recovery can be performed on the measured samples from only one SOP and the resulting calculated IF can be removed from both measurements. However, for certain data modulation formats (for example, polarization multiplexed formats), information can be encoded in orthogonal SOPs.

For these types of optical input signals, the polarization-diverse scheme shown in FIG. 7 can be used to measure the complete optical signal field including when the signal field comprises independent, polarization-multiplexed data-carrying signals. From measurements of $S_X$ and $S_Y$, the two independent, orthogonally-polarized data-carrying signals comprising the polarization-multiplexed optical input signal can be separately recovered and visualized. (It should be noted that $S_X$ and $S_Y$ do not, in general, represent the distinct polarization-multiplexed data-carrying signals, but rather each comprises a mixture thereof.) The recovery of the two orthogonal-polarization parts of the polarization-multiplexed optical input signal from $S_X$ and $S_Y$ can be undertaken in several ways. For example, the input SOP of optical input signal S can be adjusted (such as by means of a polarization controller) such that the $S_X$ and $S_Y$ directly represent the two aforementioned orthogonally-polarized data-carrying signals comprising the polarization-multiplexed signal. In this case, IF recovery may be performed independently for $S_X$ and $S_Y$ in the signal-processing part of the present invention.

Alternatively, for the polarization-multiplexed data-carrying signals case when $S_X$ and $S_Y$ are independent optical signals, it is also possible to measure $S_X$ and $S_Y$ with the same set of gates by including an optical 2-to-1 switch after the PBS 50 to toggle between measuring $S_X$ and $S_Y$.

If the two orthogonal-polarization data-carrying signal parts of the polarization-multiplexed signal are not aligned with $S_X$ and $S_Y$ (which, in the aforedescribed embodiments are defined by the axes of PBS 50), the recovery of the two orthogonal-polarization parts of polarization-multiplexed optical input signal S can be performed using known algorithms in the signal-processing part of the invention.

In order to visualize the measured electric field of optical input signal S using the present invention in a way that requires timing information for each sample (e.g. eye-diagram or data pattern visualization), a method to obtain the time-base must be used. There is a large selection of prior-art time-base designs including hardware-triggered sequential-sampling techniques, software-based sequential-sampling techniques, real-time sampling techniques (to name a few) that may be employed. It is to be understood, however, that the present invention can be implemented using many different time-base designs as long as the sampling rate is high enough for IF recovery. New algorithms for IF recovery are regularly described in the scientific and patent literature, and hence a minimum sampling rate for a certain IF cannot be readily specified. Nonetheless, in order to maximize tolerance to, for instance, phase noise in the optical carrier of optical input signal S (for instance, related to a transmitter laser having a relatively wide linewidth, e.g., greater than 1 MHz) and permit the reconstruction of repetitive optical input signals modulated according to a wide variety of known multibit-per-symbol modulation formats (e.g., QPSK, 16-QAM, etc.), it is generally preferable that the sample rate be in excess of 500 MHz. It should be noted that no time-base is needed to visualize the electric field of optical input signal S as displayed on a constellation diagram, since a constellation diagram does not include explicit timing information.

It is to be understood that other advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the claims appended hereto.

What is claimed is:

1. An optical sampling arrangement for evaluating the complete electric field, both amplitude and phase, of an optical input signal S normally comprising optically-encoded data, the optical sampling arrangement comprising
    an optical source for generating a local oscillator reference signal LO;
    an optical hybrid responsive to the optical input signal S and the reference signal LO for combining said S and LO signals and generating therefrom at least two composite output signals comprising complex-field sums of said S and LO signals with a known phase relationship therebetween;
    a strobe source for generating gating pulses at a predetermined frequency $f_s$;
    at least two sampling elements, each sampling element responsive to a separate one of the at least two composite output signals from the optical hybrid and having a gating function controlled by gating pulses from the strobe source for transforming the applied composite optical signals into a train of composite signal samples, the relative phase of each of said at least two trains of composite signal samples being independent and invariant to pulse-to-pulse phase variations of said strobe source;
    an optical-to-electrical conversion element for transforming the at least two trains of composite signal samples from the at least two sampling elements into respective electrical streams of samples; and
    a signal processor for digitizing the electrical streams of samples and extracting therefrom a representation of at least one sampled version of the electric field of optical input signal S.

2. An optical sampling arrangement as defined in claim 1 wherein the optical hybrid comprises a 9° optical hybrid and generates a set of four separate composite output signals comprising complex-field sums defined as S+LO, S−LO, S+jLO and S−jLO.

3. An optical sampling arrangement as defined in claim 1 wherein each sampling element comprises an electro-optic sampling element.

4. An optical sampling arrangement as defined in claim 1 wherein each sampling element comprises an optical sampling element.

5. An optical sampling arrangement as defined in claim 4 wherein each optical sampling element comprises a nonlinear optical sampling element.

6. An optical sampling arrangement as defined in claim 5 wherein each nonlinear optical sampling element utilizes a four-wave mixing (FWM) process to generate its train of composite optical signals.

7. An optical sampling arrangement as defined in claim 6 wherein each nonlinear optical sampling element comprises a section of highly-nonlinear optical fiber (HNLF) for providing the FWM function.

8. An optical sampling arrangement as defined in claim 1 wherein the strobe source generates electronic gating pulses.

9. An optical sampling arrangement as defined in claim 1 wherein the strobe source generates optical gating pulses.

10. An optical sampling arrangement as defined in claim 1 wherein the arrangement further comprises at least one delay element interposed between the optical hybrid and the at least two sampling elements, the delay element for synchronizing the application of the at least two composite output signals with their respective sampling gates.

11. An optical sampling arrangement as defined in claim 1 wherein the arrangement further comprises:
    a polarization-multiplexing component disposed between the optical hybrid and the at least two sampling gates, the polarization-multiplexing component for inserting pairs of orthogonal composite output signals onto a common signal path input to an associated sampling gate, where each sampling gate is configured to perform time-interleaved sampling of temporal portions of the respective pairs, each sampled pair corresponding to common temporal portions of the optical input signal.

12. An optical sampling arrangement as defined in claim 1 wherein the optical input signal S comprises a pair of polarization-multiplexed, data-carrying signals and the arrangement further comprises
    a polarization-maintaining component disposed at the optical input signal S input to the optical hybrid to decompose the polarization-multiplexed optical input signal S into a pair of orthogonally-polarized components, wherein the optical hybrid comprises a pair of separate, phase diverse optical hybrid elements, each responsive to a separate one of the pair of orthogonally-polarized components of the optical input signal S.

13. An optical sampling arrangement as defined in claim 1 wherein the gating pulses are applied as separate inputs to the at least two sampling elements.

14. An optical sampling arrangement as defined in claim 1 wherein the gating pulses are applied as an input to the optical hybrid.

15. An optical sampling arrangement as defined in claim 14 wherein the gating pulses are coupled with the reference signal LO at the input of the optical hybrid.

16. An optical sampling arrangement as defined in claim 14 wherein the gating pulses are coupled with the optical input signal S at the input of the optical hybrid.

17. An optical sampling method for performing the measurement of a representation of the complete electric field, both amplitude and phase, of an optical input signal, the method comprising the steps of:
    mixing the optical input signal and a reference optical signal in an optical hybrid so as to generate at least two replicas of the optical signal and a like number of replicas of the reference optical signal;
    combining the replicas into at least two output signals, wherein the relative phase between the optical input-signal component and the reference-signal component in each output signal is distinct;

generating gating pulses at a predetermined frequency $f_s$;

sampling the at least two output signals using the gating pulses to generate a like number of trains of output optical sample pulses, the sampling based upon a non-linear optical process such that the relative phase of each of said trains of output optical sample pulses is independent and invariant to pulse-to-pulse phase variations of said gating pulses;

converting the at least two trains of output optical sample pulses into a like number of electrical streams of samples; and processing the at least two electrical streams of samples to digitize said streams and extract therefrom a representation of at least one sampled version of the electric field of the optical input signal.

* * * * *

UNITED STATES PATENT AND TRADEMARK OFFICE
CERTIFICATE OF CORRECTION

Page 1 of 1

PATENT NO. : 8,768,180 B2
APPLICATION NO. : 13/201576
DATED : July 1, 2014
INVENTOR(S) : Westlund et al.

It is certified that error appears in the above-identified patent and that said Letters Patent is hereby corrected as shown below:

In the Claims

Column 13, line 58, Claim 2, change "9°" to --90°--

Signed and Sealed this
Second Day of September, 2014

Michelle K. Lee
*Deputy Director of the United States Patent and Trademark Office*